United States Patent Office 3,605,231
Patented Sept. 20, 1971

3,605,231
METHOD OF MAKING VEHICLE TRIM STRIP WITH ELASTOMERIC BUMPER INSERT
Charles R. Kistner, Pontiac, and Thomas W. Anderson, Troy, Mich., assignors to Textron Inc., Providence, R.I.
Original application Nov. 2, 1967, Ser. No. 680,125, now Patent No. 3,517,473, dated June 30, 1970. Divided and this application Jan. 19, 1970, Ser. No. 8,149
Int. Cl. B23p 17/00, 11/02
U.S. Cl. 29—155                    2 Claims

ABSTRACT OF THE DISCLOSURE

Method of forming and assembling a vehicle trim strip with elastomeric bumper insert and including an elongated body with a lengthwise groove and an elongated resilient member in the groove having an exposed head, the resilient member being formed as an elongated extrusion, parts of the extrusion being cut away to form feet, which are anchored in slots along the groove.

---

This is a division of our co-pending application Ser. No. 680,125, filed Nov. 2, 1967, now Pat. No. 3,517,473 issued June 30, 1970.

This invention relates to a trim strip construction and to a method of forming the trim strip.

An object of this invention is to provide a method of forming a trim strip assembly having a metal body and a resilient exposed strip.

Briefly, this invention provides a trim strip having an elongated metal body provided with a lengthwise groove in which a resilient member is received. The resilient member is elongated and can be formed of rubber or rubber-like material having a continuous head and a plurality of feet which extend through openings in the metal body. The resilient member can be formed as an elongated extrusion with portions of the extrusion between feet being cut away during the forming process.

The above and other objects and features of the invention will be apparent to those skilled in the art to which this invention pertains from the following detailed description, and the drawing, in which:

FIG. 1 is a view in side elevation showing a door panel of a vehicle with a trim strip constructed in accordance with an embodiment of this invention mounted thereon;

FIG. 2 is a view in rear elevation of the trim strip removed from the vehicle, attaching clips being shown in association therewith;

FIG. 3 is a view in section taken on the line 3—3 in FIG. 2 on an enlarged scale, a fragmentary portion of a vehicle panel being shown in association with the trim strip;

FIG. 4 is a view in section taken on the line 4—4 in FIG. 2 on an enlarged scale, a portion of the vehicle panel being shown in association with the trim strip;

FIG. 5 is a view in section taken on the line 5—5 in FIG. 2 on an enlarged scale;

FIG. 6 is a perspective view of a fragmentary portion of an extrusion from which a resilient member of the trim strip is formed;

FIG. 7 is a fragmentary perspective view showing the resilient member of the trim strip after forming; and FIG. 8 is a view in side elevation of one of the attaching clips removed from the trim strip.

In the following detailed description, and the drawing, like reference characters indicate like parts.

In FIG. 1 is shown a vehicle panel 10 which can be a door panel of an automobile or the like. A trim strip 12 is mounted on the panel 10 at a position where other objects (not shown) can hit the door panel or where the door panel could hit such other objects. The trim strip includes a metal body 13 and a resilient strip 14. The body is shaped as shown in FIGS. 3, 4 and 5, with side walls 16 and 17 (FIGS. 3 and 4) end walls 18 (FIGS. 2 and 5) and inwardly turned flanges 19 and 21 (FIGS. 3 and 4) at lower edges of the side walls 16 and 17 respectively. A lengthwise groove 22 is formed in the body 13, the groove 22 terminating short of the end walls as indicated in FIG. 5. A plurality of slots 23 are formed in the body at the base of the groove for receiving feet 24, which are integral with the resilient strip 14.

The resilient strip 14 can be manufactured as an extrusion 24', as shown in FIG. 6, with a head portion 25 being integral with an extension 26. The extension 26 is separated from the head portion 25 by necked in sections 29 and 31 so that the extension is substantially triangular in cross section. Portions of the extrusion extension 26 are cut away, as shown in FIG. 7, to form the feet 24. The resilient strip 14 is mounted in the body 13 as shown in FIGS. 3 and 4 with the feet 24 extending through the slots 23 and edge portions of the slots being received in the neck portions 29 and 31 so that the extrusion is firmly anchored in the lengthwise groove 22 with outer ends of the walls 16 and 17 overlying the resilient strip but with an outer edge portion 32 of the resilient strip being outboard of the body and in position to ward off blows from the body 13 of the trim strip and from the panel 10. The body 13 is attached to the panel 10 by a plurality of clips 34 (FIGS. 2, 4 and 8). Each clip 34 includes a generally U-shaped body 36, inwardly directed arms 37 and 38, and legs 39 and 41, all being formed of a single length of spring wire. A resilient pad 42 of rubber or the like is mounted on the arms 37 and 38. The legs 39 and 41 are adapted to extend through an opening 43 (FIG. 4) in the panel 10 to resiliently hold the trim strip in position engaging the panel 10 with the resilient pad 42 overlying the opening 43 to close the opening and to protect paint or the like on the face of the panel 10.

The trim strip and method of making same illustrated in the drawing and described above are subject to structural modification without departing from the spirit and scope of the appended claims.

Having described our invention, what we claim as new and desire to protect by Letters Patent is:

1. A method of forming a trim strip assembly which comprises forming an elongated body of sheet metal having an elongated groove in an outer face thereof and with a plurality of spaced slots in the body along the groove, forming an elongated extrusion insert of rubber-like material having a head portion receivable in the groove and an extension at an inner portion thereof of substantially triangular shape, removing spaced portions of the extension to form a plurality of spaced feet receivable in the slots, and assembling the insert and the body with the feet received and anchored in the slots and with the head portion exposed outboard of the body.

2. A method as in claim 1 wherein the body is formed with inwardly turned flanges along an inner portion thereof, and the assembly of body and insert is attached to a panel by fasteners mounted in the panel and having portions overlying the flanges.

References Cited
UNITED STATES PATENTS
2,924,008   2/1960   Haushalter _____ 29—451
3,487,518   1/1970   Hopfeld _____ 29—155

THOMAS H. EAGER, Primary Examiner

U.S. Cl. X.R.
29—451

Sept. 20, 1971     C. R. KISTNER ET AL     3,605,231
METHOD OF MAKING VEHICLE TRIM STRIP WITH
ELASTOMERIC BUMPER INSERT
Original Filed Nov. 2, 1967
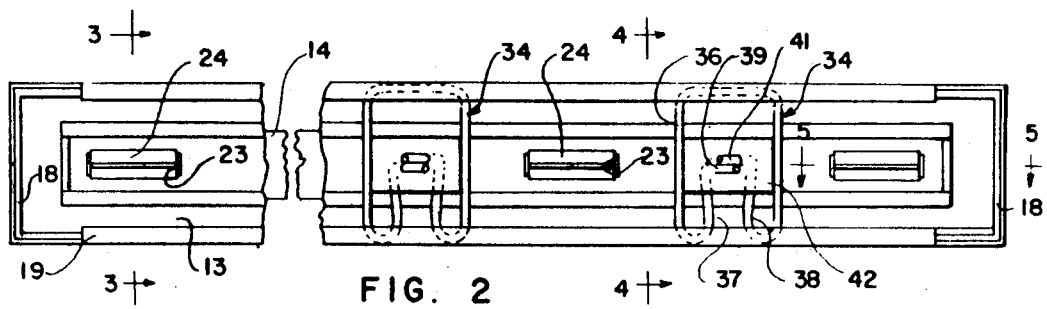
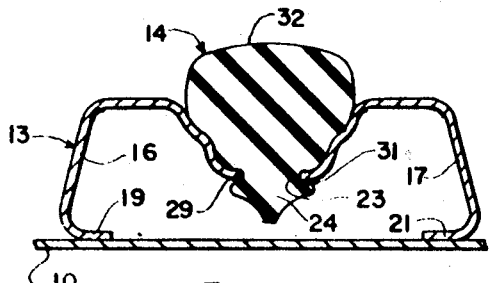
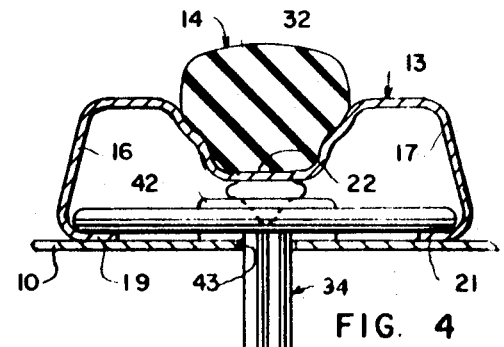
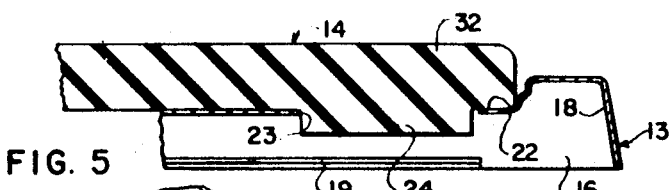
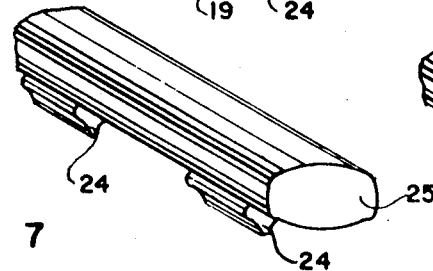
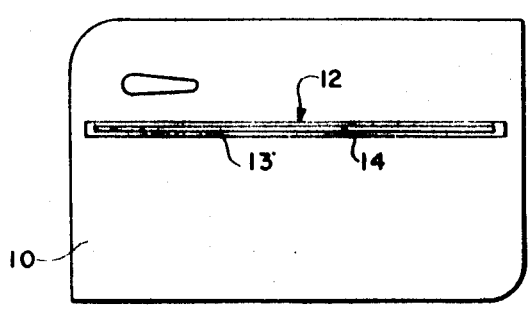
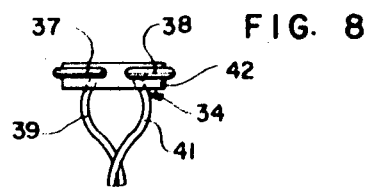
INVENTORS
THOMAS W. ANDERSON
CHARLES R. KISTNER
BY
Attorneys